United States Patent [19]
Fore

[11] Patent Number: 4,717,404
[45] Date of Patent: Jan. 5, 1988

[54] DUST SEPARATOR

[75] Inventor: Earl Fore, South Plainfield, N.J.

[73] Assignee: L.A. Dreyfus Company, Edison, N.J.

[21] Appl. No.: 20,222

[22] Filed: Feb. 27, 1987

[51] Int. Cl.⁴ ............................................. B01D 45/00
[52] U.S. Cl. ....................................... 55/444; 55/446; 55/357; 55/481
[58] Field of Search .................................. 55/442–446, 55/481, 429, 419, 357

[56] References Cited

U.S. PATENT DOCUMENTS

| | | | |
|---|---|---|---|
| 692,390 | 2/1902 | Waggoner | 55/444 |
| 885,185 | 4/1908 | Serrell | 55/446 |

FOREIGN PATENT DOCUMENTS

| | | | |
|---|---|---|---|
| 494655 | 7/1950 | Belgium | 55/444 |
| 205075 | 12/1983 | German Democratic Rep. | 55/444 |

Primary Examiner—Bernard Nozick
Attorney, Agent, or Firm—Lowe, Price, LeBlanc, Becker & Shur

[57] ABSTRACT

A dry solids separator is described for removing powdery materials from a gas stream without a substantial overall pressure drop as said stream passes through the separator. The separator consists of a plurality of mutually spaced baffle plates disposed as at an angle to the inlet of the separator. Each plate consists of a plurality of mutually spaced channel shaped baffles opening into the gas stream and defining between adjacent baffles vertical slit nozzles. The channel shaped nozzles are also staggered so that the next adjacent downstream baffle will be behind an upstream nozzle.

10 Claims, 10 Drawing Figures

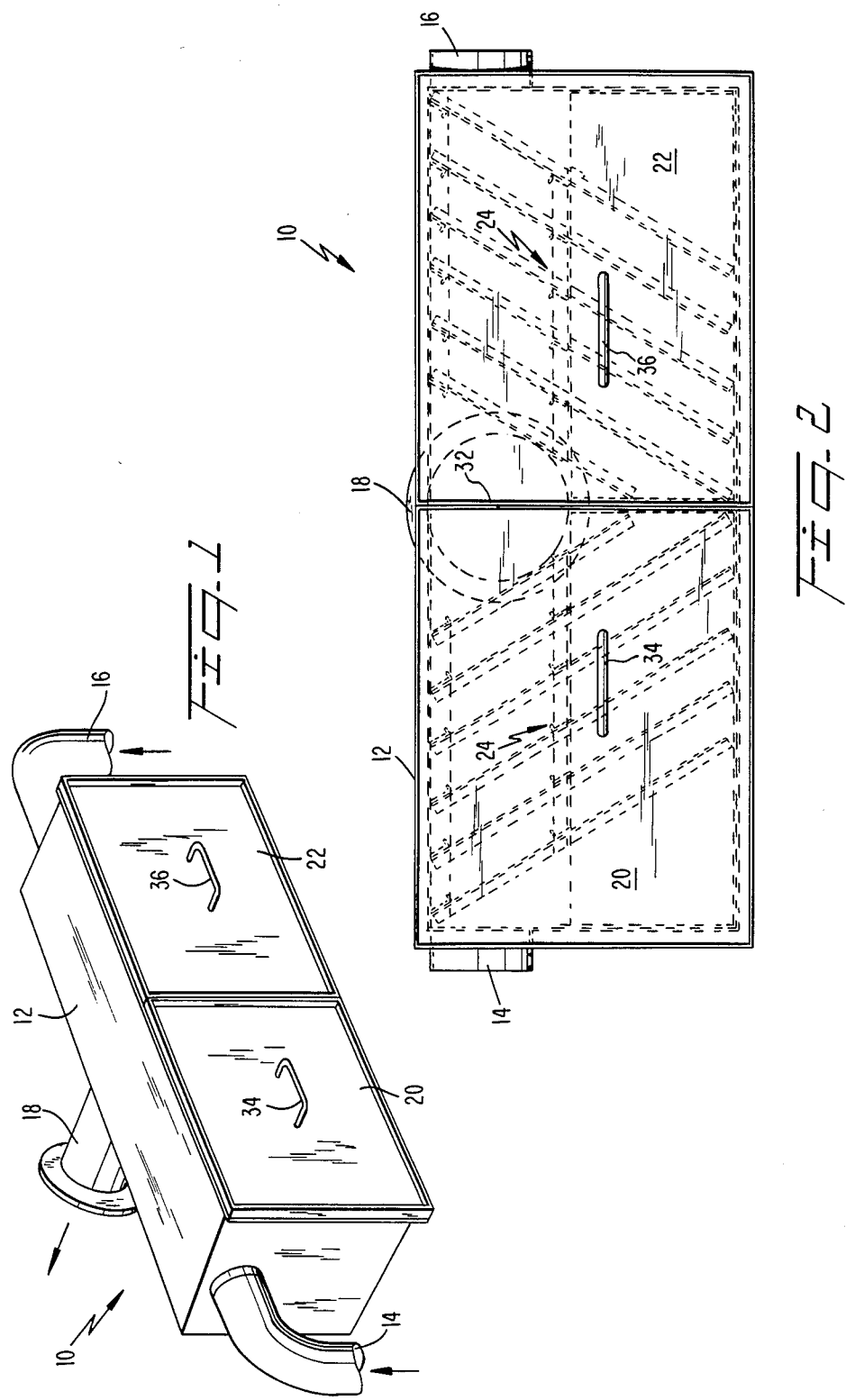

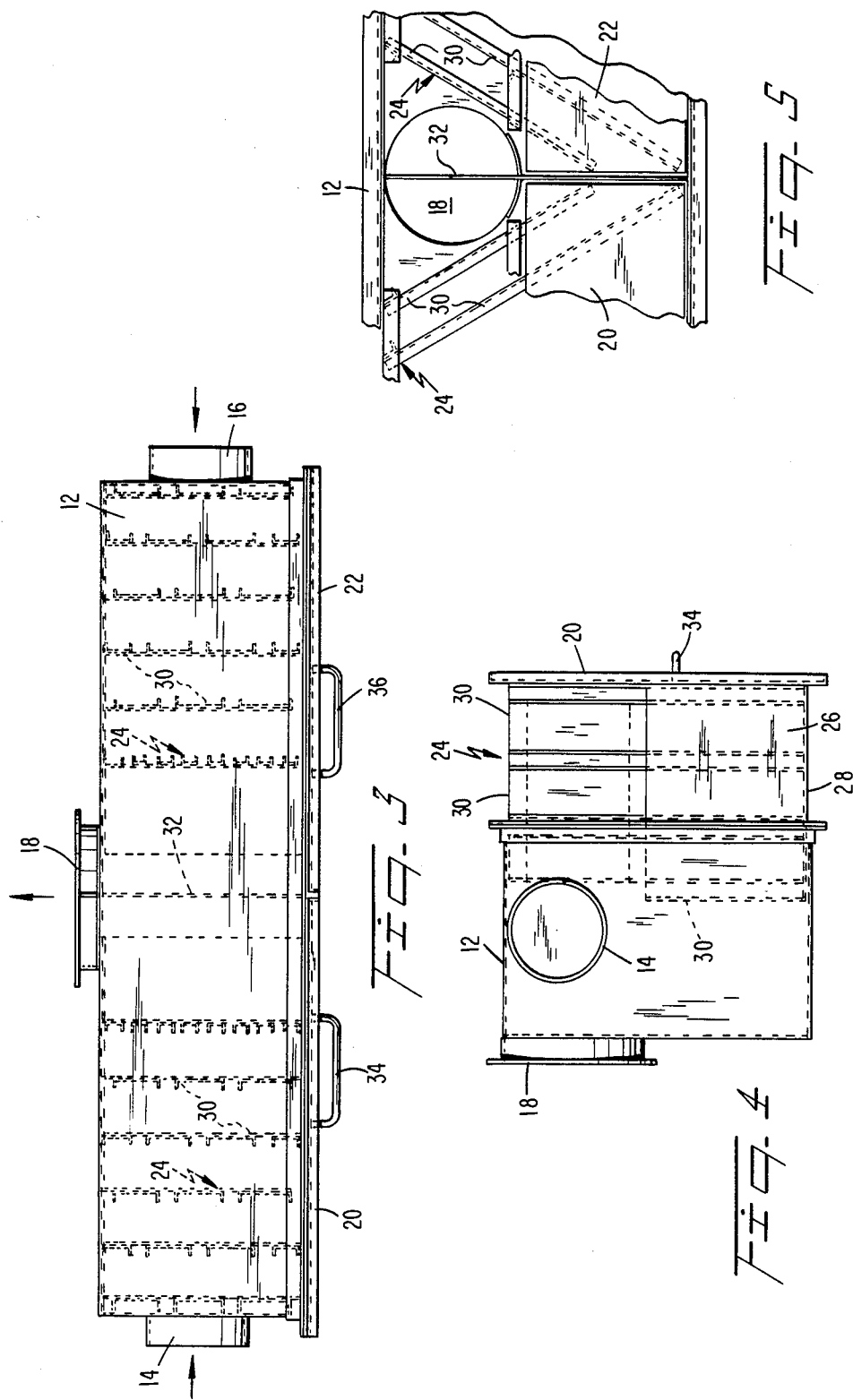

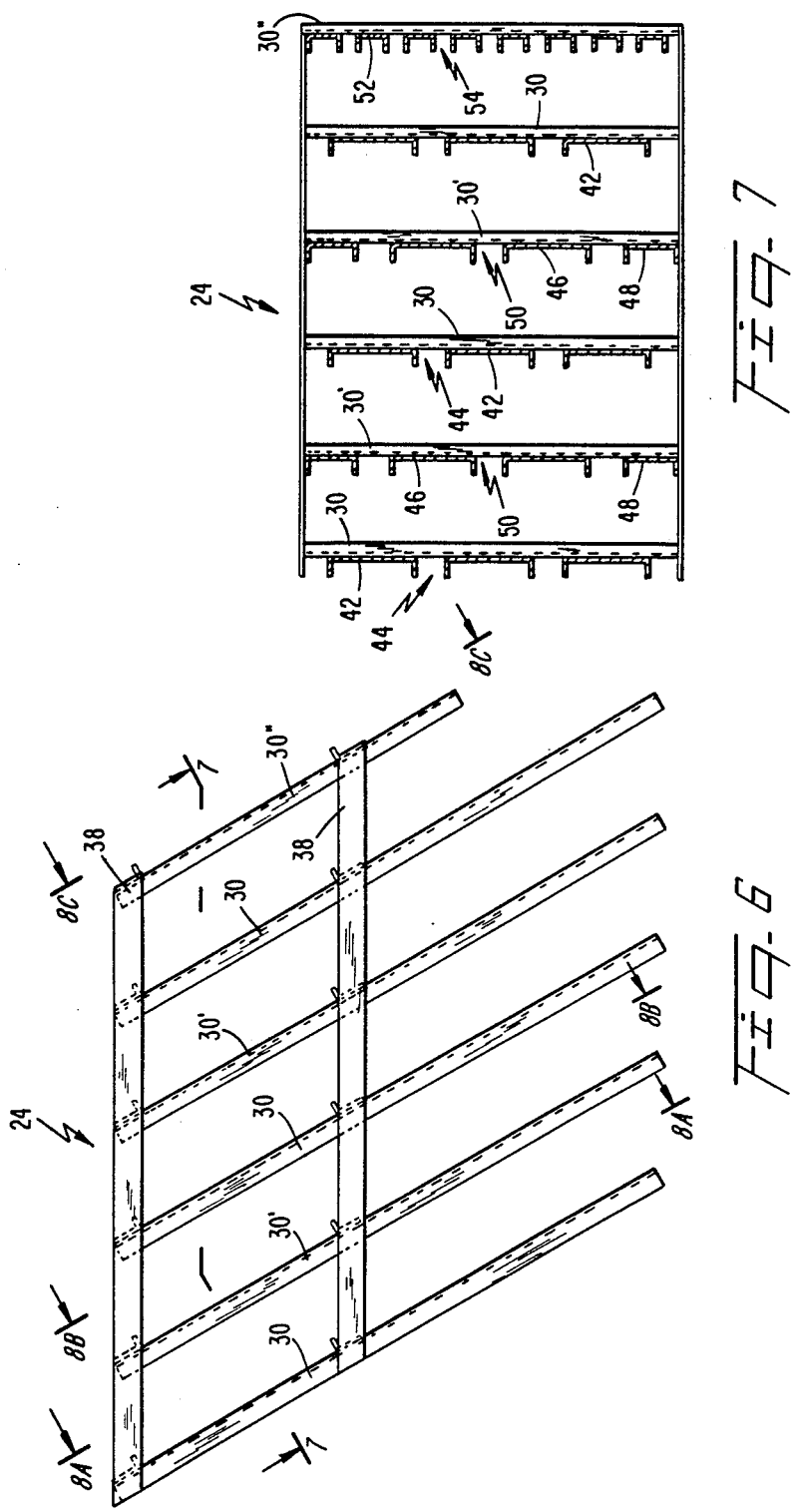

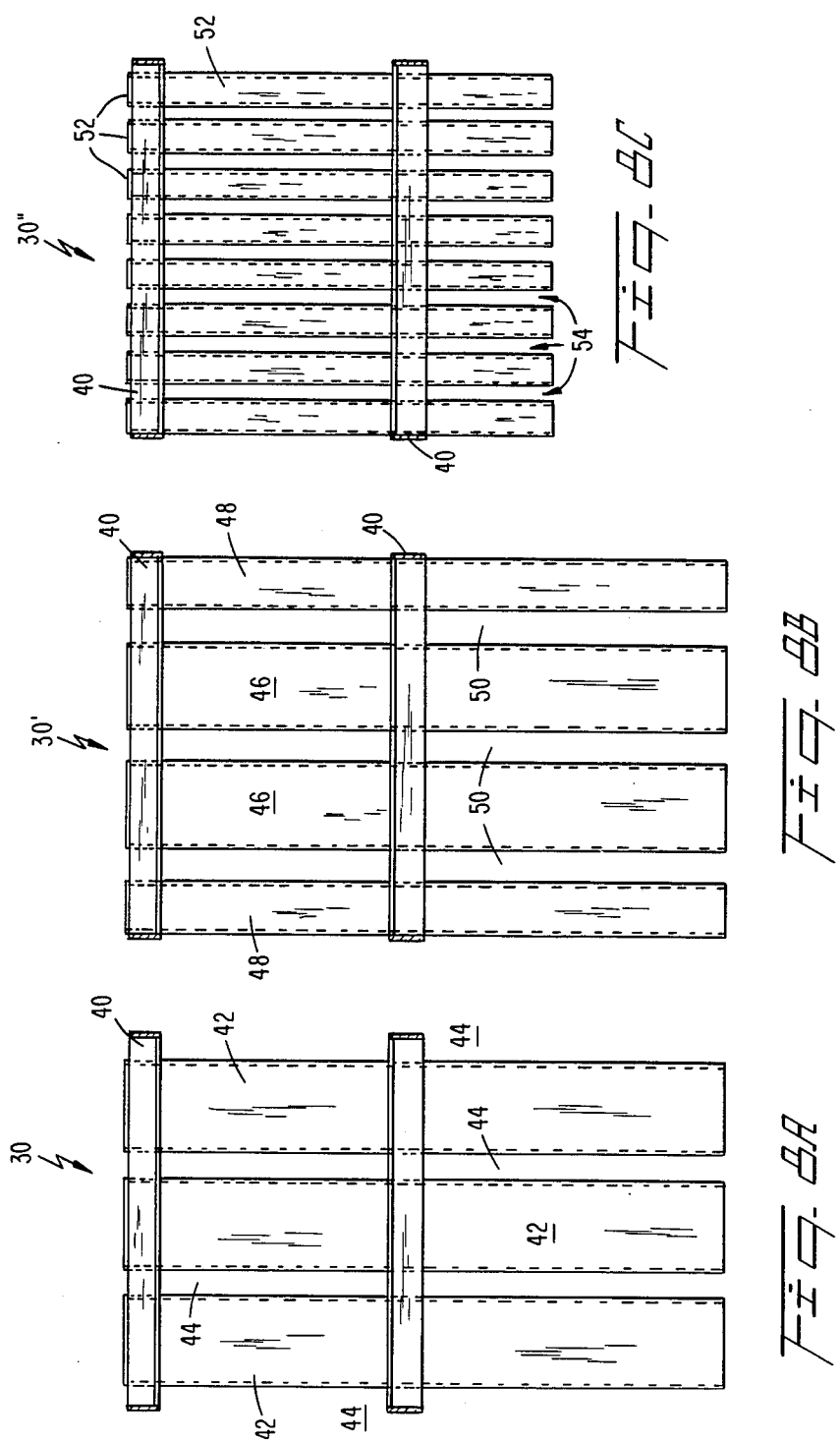

DUST SEPARATOR

This invention relates to an apparatus for separating dust particles from an air stream and in particular to a compact apparatus utilizing inclined baffles and nozzles which are staggered to separate said particles as they impinge upon the baffles.

It is known to utilize inclined, channel shaped baffles disposed in a staggered relationship against a stream of air to separate particles therefrom. See, for example, Swiss Pat. No. 287,974, dated Dec. 31, 1952. The baffles disclosed therein, however, do not provide nozzles therebetween to compensate for the velocity lost in the air stream as it encounters the baffles and they are not readily removable for cleaning.

In U.S. Pat. No. 1,434,154, issued Oct. 31, 1922, baffle plates mounted on trays were described. These plates, however, were coated with petroleum jelly or similar material to attract dust or dirt particles and therefore were not readily cleanable. A similar coated baffle plate is shown in U. S. Pat. No. 1,917,857.

In industrial operations wherein materials such as talc, ground calcium carbonate, and resins are used, fugitive dust emission can be a major problem. For example, in the preparation of chewing gum base, substantial quantities of talc or the like are used as water insoluble adjuvants and are folded into the plasticized elastomer base in large mixing kettles. Of necessity, such mixers must be hooded and the exhaust from the hood then must be cleaned before it can be emitted into the atmosphere.

Because emissions from such mixers contain extremely fine particles, ultimately, a scrubber or similar wash water system must be used to cleanse the exhaust prior to discharge. However, when the exhaust from the mixers is conveyed directly to a scrubber, the wash water will make a paste in the scrubber and downstream duct work which must periodically be removed. This type of maintenance is major maintenance and requires a shut down of the scrubber system for a substantial period of time.

It has been discovered that such maintenance requirements can be dramatically decreased by removing a major portion of the solids upstream of the scrubber with a dry solids separator. From an economic standpoint, however, it would be desirable to have a dry solid separator which could be inserted in the air stream between the hooded mixers and the scrubber without occupying a substantial amount of floor space. Therefore, such device could be retrofitted into an existing plant without a major relocation of existing equipment or expansion of the plant. In addition, it would be highly desirable if such separator could be inserted in line between the hooded mixers and the scrubber without having to increase exhaust fan capacity. In other words, it would be desirable if such a dry solids separator could be used without substantially decreasing the outlet velocity of the air stream.

Finally, it would also be highly desirable to develop such a device which could be quickly and easily cleaned without the necessity of major maintenance.

A usual type of dust collection equipment is a gravity settling chamber. Such a chamber, however, is a large installation unsuitable for retrofitting in an existing plant. Similarly, commercially available impingement separators also are too large normally for retrofitting in an existing industrial operation.

It has been discovered, however, than an effective, dry solids separator can be constructed in a housing about four feet long by one and one half feet by twenty one inches having a dual inlet in opposite ends thereof and a single outlet which will effectively remove substantial quantities of dust, powder and the like from an air stream. The device of this invention utilizes twin baffle assemblies slidably received in drawers in the housing. To clean the baffle assembly, then, the drawers are merely opened, the assembly lifted out and manually shaken to remove the dust or powder therefrom. The efficiency of the device of this invention results in an overall negligible pressure drop across the system so that excess exhaust fan capacity is not required.

The device of this invention combines settling and impingement and uses inclined, C-shaped baffles (hereafter referred to as channel shaped) with vertical nozzles therebetween and which also are staggered to create non-uniform velocity gradients within the air stream passing therethrough. In addition, the width of the nozzles decreases at the outlet to increase velocity of the outlet air after an initial decrease of velocity when the air enters the baffle assembly to avoid a significant pressure drop.

The baffle assembly consists of, preferably, five layers of baffles, each layer consisting of individual channel shaped inclined baffles interconnected and mutually spaced apart to form a vertical nozzle. The baffles are staggered so that each layer of baffles has a baffle disposed downstream of a nozzle in a previous layer.

Accordingly, as the entrained dust enters the device of this invention, an initial velocity drop causes some settling of dust particles. Impingement on the baffles causes additional deposition of solids, and then as the air stream is forced through nozzles of decreasing size formed by inclined baffles, non-uniform velocity gradients also cause deposition of additional dust particles. When the air stream then exits the outlet it has been discovered that concentration of entrained particles has been so dramatically reduced that the paste of water and dust particles previously formed in the water scrubber is not now formed.

Accordingly, it is an object of this invention to provide a small dry solids separator to remove powder, dust and the like from an air stream which will remove a substantial quantity thereof without a significant overall pressure drop by a combination of settling, impingement upon baffles, and the creation of non-uniform velocity gradients.

It is another object of this invention to provide a dry solids separator which uses baffle plates slidably received therein so that the baffles can be easily removed and shaken for cleaning.

It is still another object of this invention to provide a dry solids separator in line between hooded reaction vessels and a wet scrubber for removing substantial quantities of powder from the exhaust air stream without a substantial pressure drop wherein successive, staggered, baffle layers are disposed at an angle to the flow of the entrained solids wherein each baffle plate provides a plurality of strip nozzles for accelerating the flow therethrough.

These and other objects will become readily apparent with reference to the drawings and following description wherein:

FIG. 1 is a perspective view of the dry solids separator of this invention.

FIG. 2 is a front view of the dry solids separator of this invention.

FIG. 3 is a top view of the dry solids separator of this invention.

FIG. 4 is a side view of the dry solids separator of this invention with a baffle containing drawer partially removed therefrom.

FIG. 5 is a fragmentary front view of the device of this invention with upper drawer portions removed.

FIG. 6 is a side view of the interconnected baffle plate bundle.

FIG. 7 is a cross sectional view taken along lines 7—7 of FIG. 6.

FIG. 8a is a cross sectional view taken along line 8a of FIG. 6.

FIG. 8b is a cross sectional view taken along line 8b of FIG. 6.

FIG. 8c is a cross sectional view taken along line 8c of FIG. 6.

With attention to the drawings and to FIGS. 1-3 in particular, the device of this invention 10 as shown consists of a housing 12 having side mounted inlets 14 and 16 and an outlet 18. Air with entrained powder materials enters the housing 12 at inlets 14 and 16 and after removal of the solids therefrom, the air is exhausted through outlet 18. Inlets 14 and 16 may typically be connected to reaction vessel hoods (not shown) and outlet 18 connected to a wet scrubber (not shown). It must be pointed out that the device of this invention will not remove all powdery material down to very small particles to thereby eliminate the need for a wet scrubber. The purpose of the device of this invention, however, is to remove a substantial portion of the entrained powdery materials whereby the scrubber can be used without clogging. The device of this invention has been found to successfully remove about one ounce of powder per one thousand cubic feet of exhaust air.

It must also be noted that the device hereinafter described utilizes a dual inlet. As will be obvious to those skilled in the art, the device of this invention can have a single inlet or as many inlets as described with one inlet per baffle plate bundle.

Right and left drawers 20 and 22 are slidably received in housing 12 and each drawer slidably receives, as will be subsequently explained, a plurality of baffle plates layers 24 which are interconnected as also will be subsequently explained.

Each drawer 20 and 22 has sidewalls 26 which extend upwardly from a base 28. Each drawer has a back 30, and sidewalls 26 and backwall 30 are only about one half the height of drawers 20 and 22 permitting ready access to baffle bundle assemblies 24 for cleaning.

Concerning dimensions of the preferred embodiment, inlets 14 and 16 are preferably 6 inches in diameter and outlet 18 is preferably 8 inches in diameter. Each drawer is about 2 feet wide by 21 inches high and about one foot deep. The baffle assemblies 24 contain baffle plate layers 30 which are disposed at a 30° angle preferably to the plane containing inlets 14 and 16 and at a 60° degree angle to the base 28 of each drawer 20 and 22. A dividing wall 32 is provided between drawers 20 and 22 and handles 34 and 36 so that each drawer may be opened as shown in FIG. 4 for removal of accumulated powder therein.

The baffle plate assembly 24 which is slidably received in each drawer 20 and 22 consists of a plurality of staggered layers of baffle plates 30, 30' and 30" which are interconnected by two lateral bars 38 and to cross members 40. The assembly 24 then preferably consists of six layers. The assembly 24 is intended to be slidably received within each drawer 20 or 22 resting on the base 28 thereof as shown in the drawings.

With attention to FIG. 8a layer 30 consists of three channel shaped baffle plates 42. The plates preferably are 3 inches wide and have a space ¾ inch therebetween to form four vertical slit nozzles when disposed within drawer 20 or 22 including the space between baffles 42 and the interior surface of the drawer 20 or 22 and the back of the housing 12. Plate layer 30' consists of four baffle plates 46 and 48 which also are channel shaped. Plates 46 are 2¾ inches wide and plates 48 are 1¾ inches wide and thereby form 3 slit nozzles 50 1 inch wide. Layer 30' is the layer immediately adjacent outlet 18. Layer 30" has eight baffle plates 52 which are one inch wide and are spaced apart ½ inch to form seven slit nozzles 54. With attention to FIG. 7, baffle layers 30 and 30' are alternated so that as the exhaust passes through for example nozzles 44, it will impinge upon either baffle 46 or 48. As the exhaust further passes through slit nozzles 50 it will impinge upon channels 42. Finally, when the exhaust passes through nozzles 54 it will be further accelerated. The exhaust will then impact upon divider wall 32 which forces a 90° turn to exit out of the outlet 18. The free-air nozzle area in each baffle layer is greater than the inlet pipes (14, 16) areas therefore creating lower velocity in bottom half of box to facilitate settling of particles in drawers.

Accordingly, the baffle assembly 24 is intended to provide a plurality of nozzles which are vertical strip type nozzles and which are staggered to develop unequal velocity gradients which with the impingement effect on the baffle plates will further facilitate settling out of powder particles. As described above, the device of this invention with the dimensions above described has been effective to remove about one ounce of powder per one thousand cubic feet of exhaust gas and in test operations has removed about fifty pounds of powder per week of operation. In order to clean the device of this invention, it is only necessary to remove the drawer 20 or 22 from housing 12,, lift out baffle assembly 24 and shake it into a dry waste bin or the like. The drawer then is emptied also, the assembly 24 replaced in the drawer, and the drawer then inserted into the housing. The entire operation should not take one man more than about a half hour as compared to, in previous operations, an average of 24 man hours about every ninety days to clean the scrubber which is downstream of the device of this invention. As previously indicated, the device of this invention does not eliminate the need for a scrubber, but it greatly facilitates the maintenance requirement thereof. Furthermore, by combining the internal strip nozzles as means to accelerate the exhaust flow therethrough, additional fan capacity is not required and the device of this invention does not account for a substantial pressure drop in exhaust gas flow.

As will be obvious to those skilled in the art, the invention is not intended to be limited to the precise dimensions outlined above, which are illustrative only, and is not intended to be limited to a unit having two inlets and one outlet.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. A dry solids separator for removing powdery materials from a gas stream passing therethrough without a substantial pressure drop comprising:
   a housing having at least one gas inlet in communication with said gas stream and at least one gas outlet therefor, an opening in a front or back wall of the housing, and a drawer slidably received therein disposed between the inlet and the outlet;
   a plurality of mutually spaced, baffle plates slidably received within said drawer and disposed at an acute angle to the plane containing the inlet, each plate comprising a plurality of mutually spaced parallel, channel shaped baffles opening in the direction of flow of said gas stream through the inlet, adjacent baffles defining vertically oriented slit nozzles for accelerating the flow of gas therethrough, said individual baffles being staggered so that a baffle in each adjacent downstream plate is disposed behind each upstream nozzle in the adjacent upstream plate.

2. The separator of claim 1 wherein a plurality of plates next adjacent the outlet define nozzles of decreased width.

3. The separator of claim 2 wherein the inlet and outlet are contained in vertical planes disposed at a 90° angle to each other so that the gas stream passing through the baffle plates must make a 90° turn to exit said housing.

4. The separator of claim 2 wherein said plurality of plates consists of three plates defining nozzle widths respectively of 1 inch, ¾ inch and ½ inch.

5. The separator of claim 1 wherein said inlet is contained within a vertical plane and said plates are disposed at an angle thereto of about 30°.

6. The separator of claim 1 wherein said housing has front, back, top and bottom walls, and two end walls, and an inlet disposed in each end wall with a common outlet centrally disposed in the back wall and a pair of drawers are received through the front wall, the interior of said housing and the outlet being bisected by a dividing wall disposed between said drawers.

7. The separator of claim 6 wherein each drawer slidably receives six mutually spaced, interconnected baffle plates.

8. The separator of claim 7 wherein the inlets are contained within a vertical plane and said plates are disposed at about a 30° angle thereto.

9. The separator of claim 8 wherein the plurality of plates next adjacent the outlet define nozzles of decreased width.

10. The separator of claim 9 wherein said plurality consists of three plates defining nozzle widths respectively of 1 inch, ¾ inch and ½ inch.

* * * * *